(12) United States Patent
Nishiura et al.

(10) Patent No.: US 10,414,924 B2
(45) Date of Patent: Sep. 17, 2019

(54) WATER-BASED INK FOR INK-JET RECORDING

(71) Applicant: Brother Kogyo Kabushiki Kaisha, Nagoya-shi, Aichi-ken (JP)

(72) Inventors: Miki Nishiura, Toyoake (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 150 days.

(21) Appl. No.: 15/473,701

(22) Filed: Mar. 30, 2017

(65) Prior Publication Data

US 2017/0283630 A1    Oct. 5, 2017

(30) Foreign Application Priority Data

Mar. 31, 2016 (JP) ................. 2016-072147

(51) Int. Cl.
| | |
|---|---|
| *C09D 11/03* | (2014.01) |
| *C09D 11/037* | (2014.01) |
| *C09D 11/107* | (2014.01) |
| *C09D 11/322* | (2014.01) |
| *C09D 11/328* | (2014.01) |

(52) U.S. Cl.
CPC ............ *C09D 11/037* (2013.01); *C09D 11/03* (2013.01); *C09D 11/107* (2013.01); *C09D 11/322* (2013.01); *C09D 11/328* (2013.01)

(58) Field of Classification Search
CPC ..... C09D 11/037; C09D 11/03; C09D 11/107; C09D 11/322; C09D 11/328
USPC ......................................................... 524/83
See application file for complete search history.

(56) References Cited

U.S. PATENT DOCUMENTS

| | | |
|---|---|---|
| 5,609,671 A | 3/1997 | Nagasawa |
| 5,837,045 A | 11/1998 | Johnson et al. |
| 7,819,962 B2 | 10/2010 | Gu |
| 7,922,805 B2 | 4/2011 | Kowalski et al. |
| 8,016,404 B2 | 9/2011 | Kato et al. |
| 8,603,232 B2 | 12/2013 | Tsuzaka et al. |
| 8,858,695 B2 | 10/2014 | Gu et al. |
| 2004/0055508 A1* | 3/2004 | Miyamoto ........... C09D 11/328 106/31.47 |
| 2006/0201380 A1 | 9/2006 | Kowalski et al. |
| 2007/0100023 A1 | 5/2007 | Burns et al. |
| 2007/0100024 A1 | 5/2007 | Gu et al. |
| 2008/0241398 A1 | 10/2008 | Kato et al. |
| 2009/0165671 A1* | 7/2009 | Okuda ................ C09B 29/0037 106/31.45 |
| 2009/0229489 A1 | 9/2009 | Gu |
| 2010/0101451 A1* | 4/2010 | Goto ................... C09D 11/328 106/31.48 |
| 2014/0084578 A1 | 3/2014 | Yagi et al. |
| 2016/0075880 A1 | 3/2016 | Gu et al. |

FOREIGN PATENT DOCUMENTS

| | | |
|---|---|---|
| JP | H08-003498 A | 1/1996 |
| JP | 2000-513396 A | 10/2000 |
| JP | 3580957 B2 | 10/2004 |
| JP | 2008-524400 A | 7/2008 |
| JP | 2008-246821 A | 10/2008 |
| JP | 2009-515007 A | 4/2009 |
| JP | 2011-515535 A | 5/2011 |
| JP | 2012-025880 A | 2/2012 |
| JP | 2014-198816 A | 10/2014 |

\* cited by examiner

*Primary Examiner* — Kelechi C Egwim
(74) *Attorney, Agent, or Firm* — Banner & Witcoff, Ltd.

(57) ABSTRACT

A water-based ink for ink-jet recording includes: a colorant containing a pigment and a dye represented by the following formula (1); water; and a water-soluble resin.

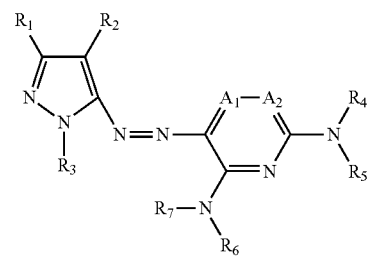

(1)

12 Claims, 1 Drawing Sheet

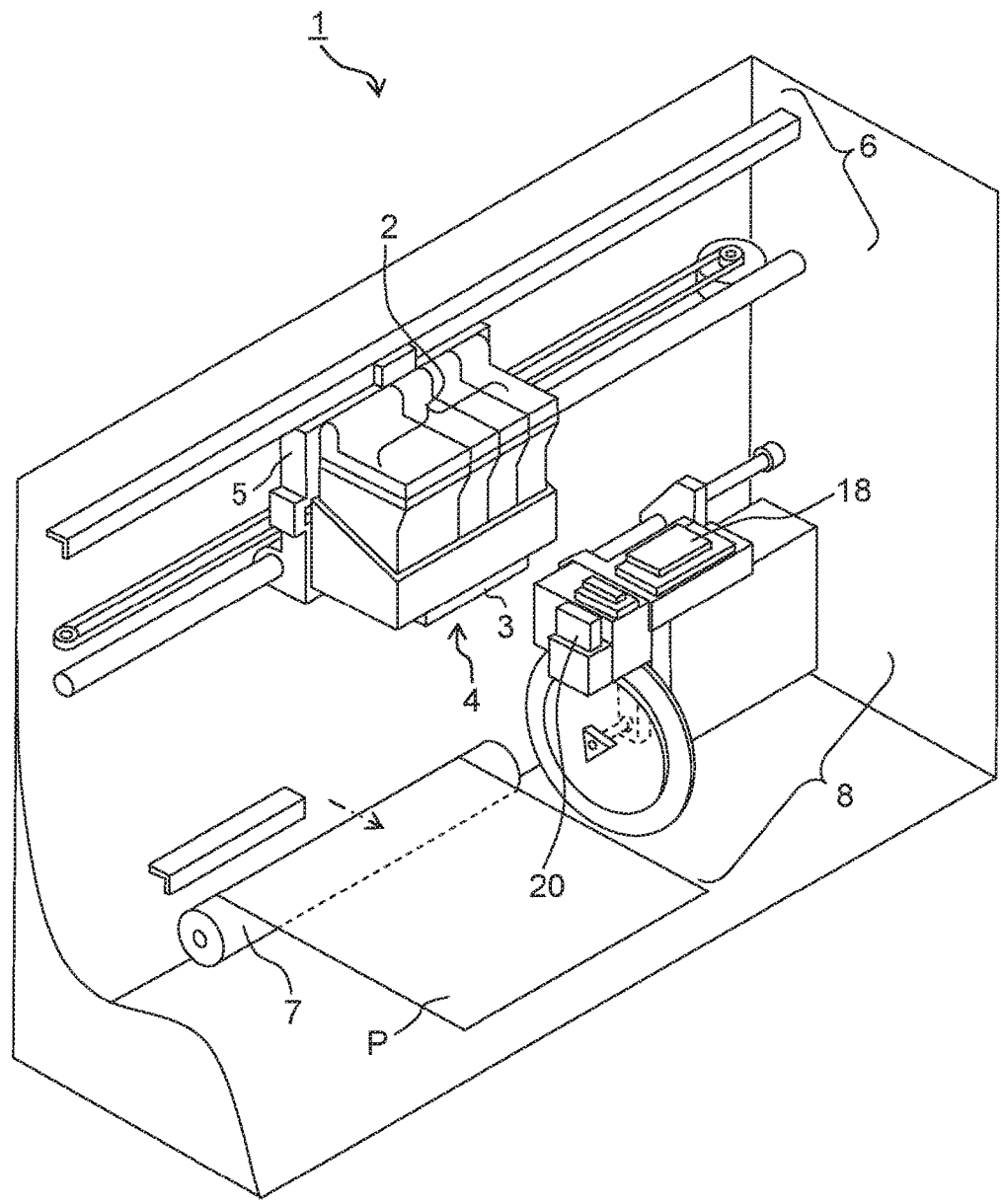

WATER-BASED INK FOR INK-JET RECORDING

CROSS REFERENCE TO RELATED APPLICATION

The present application claims priority from Japanese Patent Application No. 2016-072147 filed on Mar. 31, 2016, the disclosure of which is incorporated herein by reference in its entirety.

BACKGROUND OF THE INVENTION

Field of the Invention

The present invention relates to a water-based ink for ink-jet recording.

Description of the Related Art

A water-based pigment ink for ink-jet recording, in which a pigment is used as a colorant, is conventionally used for ink-jet recording. The pigment is insoluble in water, thus technology for dispersing the pigment in water stably is needed. As an approach for dispersing the pigment in water, using a resin for dispersing pigment is known. For example, Japanese Patent Application laid-open No. 2012-25880 discloses a water-based pigment ink containing a pigment, a resin for dispersing pigment, and water.

In order to meet speed improvement and long service life of an ink-jet recording apparatus in recent years, a water-based ink is required to provide high image quality and improve stability at the time of continuously discharging the water-based ink from nozzles of an ink-jet head. The water-based ink containing a water-soluble resin, such as the resin for dispersing pigment described above, is liable to cause ink-discharge destabilization due to, for example, adhesion of the water-soluble resin in the vicinity of nozzles of the ink-jet head. This could result in discharge-bending and the like.

SUMMARY OF THE INVENTION

An object of the present teaching is to provide a water-based ink for ink-jet recording that has improved chromaticness (color, hue, tint) and is not likely to cause discharge-bending and the like.

According to an aspect of the present teaching, there is provided a water-based ink for ink-jet recording, including: a colorant containing a pigment and a dye represented by the following formula (1); water; and a water-soluble resin,

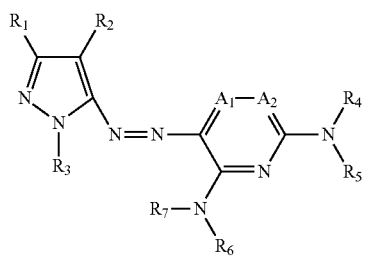

(1)

in the formula (1), $R_1$ is a hydrogen atom, a substituted or non-substituted alkyl group, or a substituted or non-substituted aryl group, $R_2$ is a hydrogen atom, a halogen atom, or a cyano group, $R_3$ is a hydrogen atom, a substituted or non-substituted alkyl group, a substituted or non-substituted aryl group, or a substituted or non-substituted heterocyclic group, each of $R_4$, $R_5$, $R_6$ and $R_7$ is a hydrogen atom, a substituted or non-substituted alkyl group, a substituted or non-substituted aryl group, a substituted or non-substituted heterocyclic group, a substituted or non-substituted sulfonyl group, or a substituted or non-substituted acyl group, $R_4$, $R_5$, $R_6$ and $R_7$ are identical to or different from each other, $R_4$ and $R_5$ are not simultaneously the hydrogen atom, $R_6$ and $R_7$ are not simultaneously the hydrogen atom, and both of $A_1$ and $A_2$ are substituted or non-substituted carbon atoms, or one of $A_1$ and $A_2$ is a substituted or non-substituted carbon atom and the other of $A_1$ and $A_2$ is a nitrogen atom.

BRIEF DESCRIPTION OF THE DRAWINGS

The FIGURE is a schematic perspective view of an exemplary configuration of an ink-jet recording apparatus of the present teaching.

DESCRIPTION OF THE EMBODIMENTS

A water-based ink for ink-jet recording according to the present teaching (hereinafter rerefer to as "water-based ink" or "ink" in some cases) will be explained. The water-based ink for ink-jet recording according to the present teaching contains a colorant and water.

The colorant contains a pigment and a dye represented by the formula (1).

The pigment is not particularly limited, but preferably contain a magenta pigment. The water-based ink of the present teaching is preferably a magenta ink. The chromaticness (color, hue, tint) of the magenta ink could greatly affect the chromaticness (color, hue, tint) of an entire recorded matter. Thus, improving the chromaticness of magenta ink may improve the chromaticness of the entire recorded matter. The pigment may be a resin-dispersible pigment or self-dispersible pigment.

The resin-dispersible pigment is dispersible in water by a resin for dispersing pigment (resin dispersant). Examples of the magenta pigment usable as the resin-dispersible pigment include C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C. I. Pigment Violets 19 and 196; and solid solutions of the above-listed pigments. Examples of the solid solutions include a solid solution containing two pigments of C.I. Pigment Red 122 and C.I. Pigment Violet 19 and a solid solution containing two pigments of C.I. Pigment Red 202 and C.I. Pigment Violet 19. When the former solid solution is used, the weight ratio between C.I. Pigment Red 122 (X) and C.I. Pigment Violet 19 (Y) is, for example, X:Y=1:0.1 to 10. The weight ratio, however, is not limited thereto. When the latter solid solution is used, the weight ratio between C.I. Pigment Red 202 (Z) and C.I. Pigment Violet 19 (Y) is, for example, Z:Y=1:0.1 to 10. The weight ratio, however, is not limited thereto. Among the above, at least one of quinacridone and derivatives thereof is preferably used as the magenta pigment, and C.I. Pigment Red 122 is more preferably used as the magenta pigment.

Regarding the resin-dispersible pigment, although the ratio between the pigment and the resin dispersant is not particularly limited, for example, pigment:resin dispersant (weight ratio)=1:0.05 to 1, 1:0.1 to 0.8, or 1:0.2 to 0.5 is satisfied. Namely, the weight ratio of the resin dispersant to the pigment is, for example, 0.05 to 1, preferably 0.1 to 0.8, more preferably 0.2 to 0.5.

The self-dispersible pigment is dispersible in water without using any resin dispersant, for example, owing to the fact that at least one of a hydrophilic functional group and the salt thereof including, for example, carbonyl group, hydroxyl group, carboxylic acid group, sulfonic acid group (sulfonate group), and phosphoric acid group (phosphate group) is introduced into the surfaces of pigment particles by the chemical bond directly or with any group intervening therebetween. It is possible to use self-dispersible pigments subjected to the surface treatment by any one of methods described, for example, in Japanese Patent Application Laid-open No. HEIS-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. US 2006/0201380 A1), Published Japanese Translation of PCT International Publication for Patent Application No. 2009-515007 (corresponding to United States Patent Application Publication Nos. US 2007/0100023 A1, US 2007/0100024 A1, and US 2016/0075880 A1), and Published Japanese Translation of PCT International Publication for Patent Application No. 2011-515535 (corresponding to United States Patent Application Publication No. US 2009/0229489 A1). The self-dispersible pigment may be, for example, a commercially available product. When using the magenta pigment, examples of the commercially available product include "CAB-O-JET (trade name) 260M" and "CAB-O-JET (trade name) 465M" produced by Cabot Corporation.

The pigment may or may not contain pigments other than the magenta pigment (e.g., yellow pigment, cyan pigment, and black pigment).

The solid content blending amount (P) of the pigment (pigment solid content amount) in the entire amount of the water-based ink is not particularly limited, and may be appropriately determined based on, for example, a desired chromaticness. The pigment solid content amount is, for example, in a range of 0.1% by weight to 20% by weight, in a range of 1% by weight to 15% by weight, or in a range of 2% by weight to 10% by weight. It is allowable that only one kind of the pigment as described above is used singly, or two or more kinds of the pigments are used in combination.

In the formula (1), the halogen atom is exemplified, for example, by fluorine atom, chlorine atom, bromine atom, and iodine atom.

In the formula (1), the substituted or non-substituted alkyl group is preferably an alkyl group having 1 to 6 carbon atom(s). The substituted or non-substituted alkyl group is exemplified, for example, by methyl group, ethyl group, n-butyl group, isopropyl group, tert-butyl group, hydroxyethyl group, methoxyethyl group, cyanoethyl group, trifluoromethyl group, 3-sulfopropyl group, and 4-sulfobutyl group. The substituent of the substituted alkyl group is exemplified, for example, by hydroxyl group; alkoxy group such as methoxy group and ethoxy group; cyano group; halogen atom such as fluorine atom, chlorine atom, bromine atom and iodine atom; and ionic hydrophilic group such as carboxylate and sulfonate.

In the formula (1), the substituted or unsubstituted aryl group is preferably an aryl group having 6 to 12 carbon atoms. In the case of the substituted aryl group, the number of carbon atom(s) does not include the number of carbon atom(s) of the substituent. The substituted or unsubstituted aryl group is exemplified, for example, by phenyl group, naphthyl group, p-tolyl group, p-octylphenyl group, mesityl group, p-methoxyphenyl group, o-chlorophenyl group, and m-(3-sulfopropylamino)phenyl group. The substituent of the substituted aryl group is exemplified, for example, by alkyl group such as methyl group, ethyl group, isopropyl group, tert-butyl group, and n-octyl group; the same or equivalent alkoxy group as that described above; the same or equivalent halogen atom as that described above; alkylamino group such as methylamino group and dimethylamino group; amide group; carbamoyl group; sulfamoyl group; sulfoamide group; hydroxyl group; ester group such as methoxycarbonyl group and ethoxycarbonyl group; and the same or equivalent ionic hydrophilic group as that described above.

In the formula (1), the substituted or unsubstituted heterocyclic group is preferably 5-membered or 6-membered heterocyclic group. The substituted or unsubstituted heterocyclic group is exemplified, for example, by 2-pyridyl group, 2-thienyl group, 2-thiazolyl group, 2-benzothiazolyl group, 2-furyl group, 6-sulfobenzothiazolyl group, and 6-sulfonate benzothiazolyl group. The substituent of the substituted heterocyclic group is exemplified, for example, by amide group; carbamoyl group; sulfamoyl group; sulfoamide group; hydroxyl group; the same or equivalent ester group as that described above; and the same or equivalent ionic hydrophilic group as that described above.

In the formula (1), the substituted or unsubstituted sulfonyl group is exemplified, for example, by methylsulfonyl group and phenylsulfonyl group. The substituent of the substituted sulfonyl group is exemplified, for example, by the same or equivalent substituted or unsubstituted alkyl group as that described above and the same or equivalent substituted or unsubstituted aryl group as that described above.

In the formula (1), the substituted or unsubstituted acyl group is preferably an acyl group having 1 to 12 carbon atom(s). In the case of the substituted acyl group, the number of carbon atom(s) does not include the number of carbon atom(s) of the substituent. The substituted or unsubstituted acyl group is exemplified, for example, by acetyl group, benzoyl group, and chloroacetyl group. The substituent of the substituted acyl group is exemplified, for example, by the same or equivalent ionic hydrophilic group as that described above.

In the formula (1), as described above, both of $A_1$ and $A_2$ are substituted or unsubstituted carbon atoms, or one of $A_1$ and $A_2$ is a substituted or unsubstituted carbon atom and the other is a nitrogen atom. The structure, in which both of $A_1$ and $A_2$ are carbon atoms, is preferable in that more excellent performance may be exhibited. The substituent, which is bonded to the carbon atoms of $A_1$ and $A_2$, is exemplified, for example, by alkyl group having 1 to 3 carbon atom(s), carboxyl group, carbamoyl group, and cyano group.

As described above, in the formula (1), $R_4$ and $R_5$ are not simultaneously the hydrogen atom, and $R_6$ and $R_7$ are not simultaneously the hydrogen atom as well. In the formula (1), there is such a tendency that water solubility improves as the number of substituents of the sulfonic acid group or the carboxyl group increases. Thus, the number of substituents is preferably adjusted, as needed.

The preferable form of the dye represented by the formula (1) is exemplified, for example, by such a form that $R_1$ is alkyl group, R₂ is cyano group, R₃ is hydrogen atom or substituted or unsubstituted heterocyclic group, R₄ is hydrogen atom, substituted or unsubstituted heterocyclic group, or substituted aryl group, R₅ and R₆ are substituted heterocyclic groups or substituted aryl groups respectively, R₇ is hydrogen atom, A₁ is substituted carbon atom, and A₂ is substituted or unsubstituted carbon atom in the formula (1).

The more preferable form of the dye represented by the formula (1) is exemplified, for example, by such a form that R₁ is tert-butyl group, R₂ is cyano group, R₃ is hydrogen atom or benzothiazolyl group which may be substituted with sulfonic acid group or alkali metal salt group thereof (preferably benzothiazole-2-yl group), R₄ is hydrogen atom, benzothiazolyl group which may be substituted with sulfonic acid group or alkali metal salt group thereof (preferably benzothiazole-2-yl group), or trialkylphenyl group which is substituted with sulfonic acid group or alkali metal salt group thereof (preferably mesityl group), R₅ and R₆ are mono-, di-, or trialkylphenyl groups which may be substituted with sulfonic acid group or alkali metal salt group thereof (preferably p-octylphenyl groups or mesityl groups) or benzothiazolyl groups which are substituted with sulfonic acid group or alkali metal salt group thereof (preferably benzothiazole-2-yl group) respectively, R₇ is hydrogen atom, A₁ is carbon atom which is substituted with alkyl group (preferably methyl group), and A₂ is carbon atom which may be substituted with cyano group in the formula (1).

The dye represented by the formula (1) can be manufactured in accordance with known methods. For example, it can be manufactured by the method disclosed in U.S. Pat. No. 8,603,232.

Preferable specified examples of the dye represented by the formula (1) include compounds represented by formulae (1-A) to (1-F).

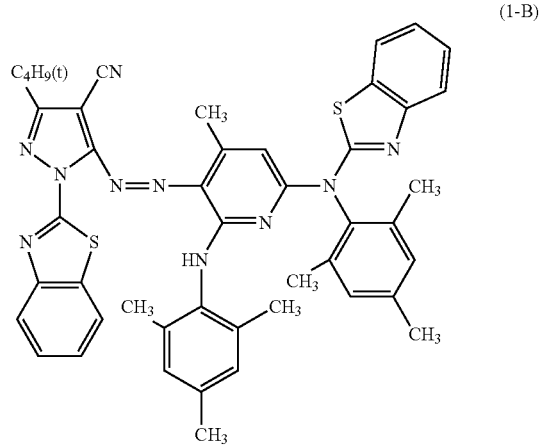

(1-B)

The compound represented by the formula (1-B) resides in such a form that R₁ is tert-butyl group, R₂ is cyano group, R₃ and R₄ are benzothiazole-2-yl groups respectively, R₅ and R₆ are mesityl groups respectively, R₇ is hydrogen atom, A₁ is carbon atom substituted with methyl group, and A₂ is carbon atom in the formula (1).

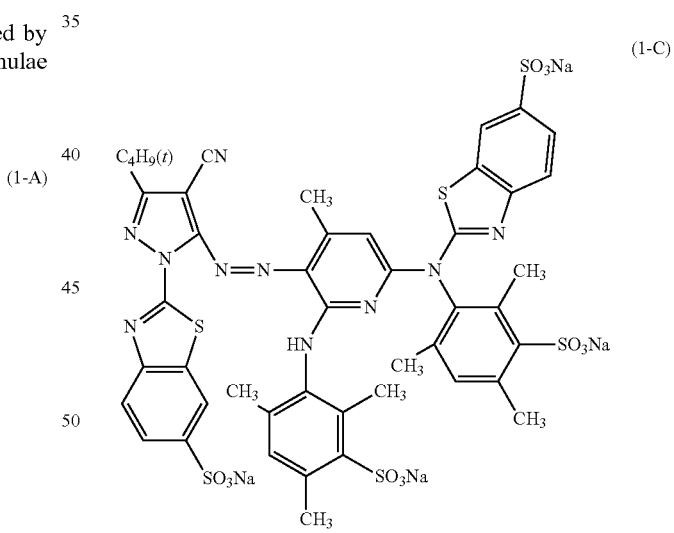

(1-A)

(1-C)

The compound represented by the formula (1-A) resides in such a form that R₁ is tert-butyl group, R₂ is cyano group, R₃ is benzothiazole-2-yl group, R₄ is hydrogen atom, R₅ and R₆ are p-octylphenyl groups respectively, R₇ is hydrogen atom, A₁ is carbon atom substituted with methyl group, and A₂ is carbon atom substituted with cyano group in the formula (1).

The compound represented by the formula (1-C) resides in such a form that R₁ is tert-butyl group, R₂ is cyano group, R₃ and R₄ are 6-sulfosodium salt benzothiazole-2-yl groups respectively, R₅ and R₆ are 3-sulfosodium salt mesityl groups respectively, R₇ is hydrogen atom, A₁ is carbon atom substituted with methyl group, and A₂ is carbon atom in the formula (1).

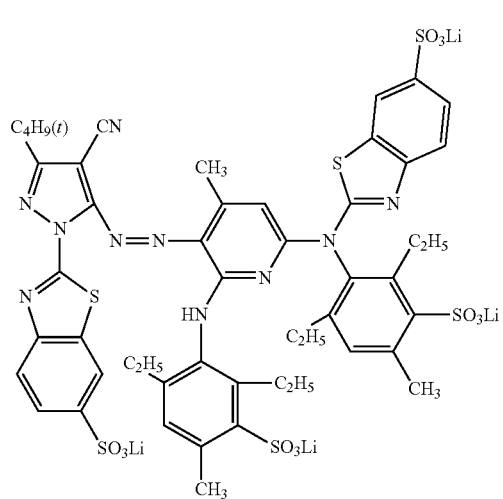

(1-D)

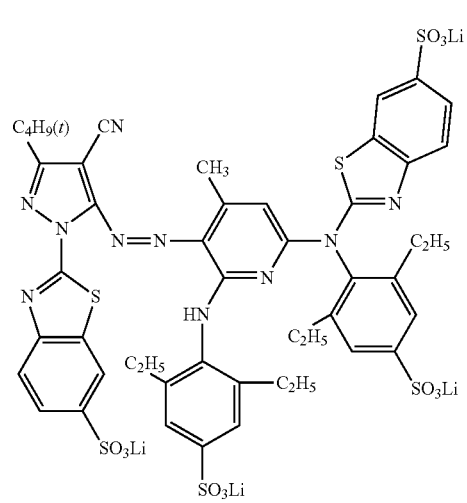

(1-F)

The compound represented by the formula (1-D) resides in such a form that $R_1$ is tert-butyl group, $R_2$ is cyano group, $R_3$ and $R_4$ are 6-sulfolithium salt benzothiazole-2-yl groups respectively, $R_5$ and $R_6$ are 2,6-diethyl-4-methyl-3-sulfolithium salt phenyl groups respectively, $R_7$ is hydrogen atom, $A_1$ is carbon atom substituted with methyl group, and $A_2$ is carbon atom in the formula (1).

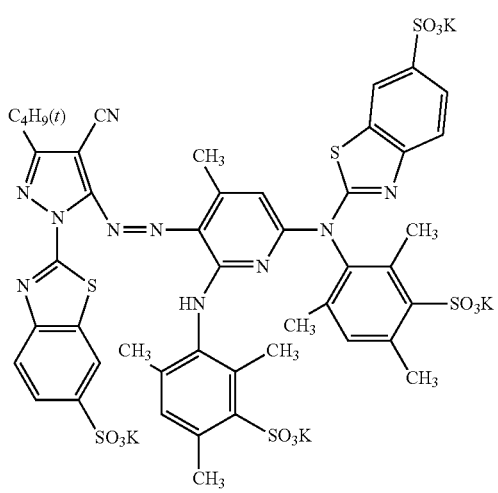

(1-E)

The compound represented by the formula (1-E) resides in such a form that $R_1$ is tert-butyl group, $R_2$ is cyano group, $R_3$ and $R_4$ are 6-sulfopotassium salt benzothiazole-2-yl groups respectively, $R_5$ and $R_6$ are 3-sulfopotassium salt mesityl groups respectively, $R_7$ is hydrogen atom, $A_1$ is carbon atom substituted with methyl group, and $A_2$ is carbon atom in the formula (1).

The compound represented by the formula (1-F) resides in such a form that $R_1$ is tert-butyl group, $R_2$ is cyano group, $R_3$ and $R_4$ are 6-sulfolithium salt benzothiazole-2-yl groups respectively, $R_5$ and $R_6$ are 2,6-diethyl-4-sulfolithium salt phenyl groups respectively, $R_7$ is hydrogen atom, $A_1$ is carbon atom substituted with methyl group, and $A_2$ is carbon atom in the formula (1).

The solid content blending amount (D) of the dye represented by the formula (1) in the entire amount of the water-based ink is, for example, in a range of 0.1% by weight to 5% by weight, in a range of 0.5% by weight to 3% by weight, or 1% by weight or more. When the solid content blending amount (D) is 1% by weight or more, it is possible to obtain the water-based ink that has more improved chromaticness and is much less likely to cause discharge-bending and the like.

The water-based ink may or may not contain another dye in addition to the dye represented by the formula (1).

In the water-based ink of the present teaching, the colorant contains the pigment as a main component. Thus, the solid content blending amount (P: % by weight) of the pigment is greater than the solid content blending amount (D: % by weight) of the dye represented by the formula (1) in the entire amount of the water-based ink. The water-based ink of the present teaching is a water-based pigment ink containing the dye represented by the formula (1). Since the water-based ink of the present teaching is the water-based pigment ink that is excellent in water resistance and contains the dye represented by the formula (1), the water-based ink of the present teaching has improved chromaticness and is not likely to cause discharge-bending. In view of improving water resistance and chromaticness and preventing discharge-bending, the ratio (D/P) of the solid content blending amount (D) of the dye to the solid content blending amount (P) of the pigment in the water-based ink of the present teaching is preferably less than 1, more preferably 0.1 to 0.8.

The water may be ion-exchanged water or pure water (purified water). The blending amount of the water in the entire amount of the water-based ink may be, for example, the balance of the other components.

The water-based ink further contains a water-soluble resin. When the pigment is the resin-dispersible pigment, the water-soluble resin may be, for example, a resin for dispersing pigment (resin dispersant), a resin for pigment fixation (binder resin) that helps the pigment fixation on a surface of a recording medium, that functioning as the resin dispersant and the binder resin, or both of the resin dispersant and the binder resin. When the pigment is the self-dispersible pigment, the water-soluble resin is, for example, the binder resin.

The resin dispersant is exemplified, for example, by that containing at least one of methacrylic acid and acrylic acid as a monomer, such as acrylic acid-acrylic acid ester copolymer. The resin dispersant may be prepared privately or independently. The resin dispersant may be, for example, a commercially available product. Examples of the commercially available product include "JOHNCRYL (trade name) 611", "JOHNCRYL (trade name) 586", "JOHNCRYL (trade name) 687", "JOHNCRYL (trade name) 63", and "JOHNCRYL (trade name) HPD296" produced by BASF Corporation (the former Johnson Polymer L.L.C.); "Disperbyk 190" and "Disperbyk 191" produced by BYK additives & Instruments; and "SOLSPERSE 20000" and "SOLSPERSE 27000" produced by Zeneca.

The binder resin is exemplified, for example, by acrylic resin, styrene acrylic resin, urethane resin, polyvinyl alcohol resin, sodium polyacrylate, acrylic acid-maleic acid copolymer salt, styrene-maleic anhydride copolymer resin, vinyl acetate resin, vinyl acetate-acrylate copolymer resin, and vinyl acetate-ethylene copolymer resin. The binder resin may be prepared privately or independently, or a commercially available product may be used for the binder resin. Examples of the commercially available product include "JOHNCRYL (trade name) 537" (acrylic resin), "JOHNCRYL (trade name) 60" (acrylic resin), "JOHNCRYL (trade name) 450" (styrene acrylic resin), "JOHNCRYL (trade name) 390" (acrylic resin), "JOHNCRYL (trade name) 62" (styrene acrylic resin), "JOHNCRYL (trade name) HPD-96" (styrene acrylic resin), and "JOHNCRYL (trade name) 61J" (styrene acrylic resin) produced by BASF Corporation (the former Johnson Polymer L.L.C.); "F-52" (acrylic resin), "KE-1148" (acrylic resin), and "PE-1304" (styrene acrylic resin) produced by SEIKO PMC CORPORATION; "SUPERFLEX 210" (urethane resin) and "SUPERFLEX E-4000" (urethane resin, active ingredient amount=45% by weight) produced by DAI-ICHI KOGYO SEIYAKU CO., LTD.; "UCOAT (trade name) UWS-145" (urethane resin), "PERMARIN (trade name) UA-150" (urethane resin), and "PERMARIN (trade name) UA-368" (urethane resin) produced by Sanyo Chemical Industries, Ltd.; "PVA-220" (10% aqueous solution of polyvinyl alcohol resin) and "PVA-203" (10% aqueous solution of polyvinyl alcohol resin) produced by KURARAY CO., LTD.; and "AQUALIC (trade name) L DL-40" (sodium polyacrylate, active ingredient amount=40% by weight) and "AQUALIC (trade name) L TL-37" (acrylic acid-maleic acid copolymer salt, active ingredient amount=37% by weight) produced by NIPPON SHOKUBAI CO., LTD. The above examples of the binder resin may be used as the resin dispersant.

Of the above examples, acrylic resin is preferably used as the water-soluble resin, and the acrylic acid-acrylic acid ester copolymer and/or styrene acrylic resin is/are more preferably used as the water-soluble resin. Such resins are excellent in pigment dispersibility and/or pigment fixing property.

Only one kind of the water-soluble resin may be used singly, or two or more kinds of the water-soluble resins may be used in combination. The solid content blending amount (R) of the water-soluble resin in the entire amount of the water-based ink is, for example, in the range of 0.05% by weight to 5% by weight, 0.3% by weight to 3% by weight, or 0.5% by weight to 2% by weight.

The inventors of the present application revealed that the water-based ink, which contains the pigment, the dye represented by the formula (1), and the water-soluble resin, has improved chromaticness and is not likely to cause discharge-bending and the like. Although details of the mechanism are unclear, it may be assumed as follows. First, since the dye represented by the formula (1) has high chromaticness, the water-based ink containing the dye represented by the formula (1) may have improved chromaticness. Further, the dye represented by the formula (1) may interact with the water-soluble resin in some way to prevent the discharge-bending and the like. As described above, one of the factors of discharge-bending of the water-based ink is the water-soluble resin adhering to the vicinity of nozzles of an ink-jet head. Although the water-soluble resin in the water-based ink may interact with the pigment and may be present in the vicinity of the pigment, a part of the water-soluble resin may float in the water-based ink. This excessive water-soluble resin floating in the water-based ink could cause discharge-bending. Regarding the dye represented by the formula (1) in the water-based ink, hydrophobic parts (hydrophobic groups) in molecules may be repelled by an aqueous solvent of the water-based ink, and the hydrophobic interaction may make the repelled hydrophobic parts approach each other. Meanwhile, hydrophilic parts (hydrophilic groups) having a high degree of affinity for the aqueous solvent may attempt to spread in the aqueous solvent. This may allow the dye represented by the formula (1) to have a bulky configuration in which the hydrophobic groups are arranged inside and the hydrophilic groups are arranged outside. Spaces may be formed between the hydrophobic groups that are arranged on the inside of the configuration and interact with each other. The excessive water-soluble resin in the water-based ink may be effectively taken up (adsorbed) by the spaces that are present on the inside of the dye represented by the formula (1). Accordingly, solubility of the excessive water-soluble resin may increase, thus reducing the possibility that the water-soluble resin adheres to the vicinity of nozzles and preventing discharge-bending. Those mechanisms, however, are just assumptions and have no influence on the present teaching.

In the water-based ink, the ratio (R/D) of the solid content blending amount (R: % by weight) of the water-soluble resin to the solid content blending amount (D: % by weight) of the dye represented by the formula (1) in the entire amount of the water-based ink is preferably 0.5 to 2. If R/D=0.5 to 2 is satisfied, it is possible to obtain the water-based ink that has more improved chromaticness and is much less likely to cause discharge-bending and the like. If the ratio (R/D) exceeds 2, the amount of the water-soluble resin is greater than the amount of the dye. This could reduce the effect of preventing discharge-bending. If the ratio (R/D) is less than 0.5, the water-based ink contains a large amount of the dye as the colorant, which could reduce water resistance that is an advantage of the pigment ink.

The water-based ink may further contain a nonionic surfactant. The nonionic surfactant is exemplified, for example, by an acetylenic glycol-based surfactant. The acetylenic glycol-based surfactant is exemplified, for example, by a compound represented by the formula (2).

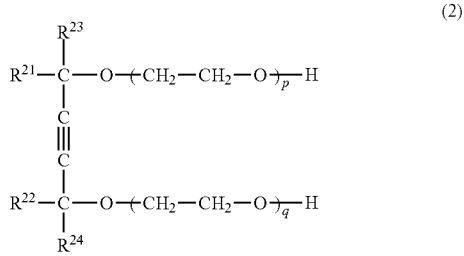

(2)

In the formula (2), p and q may be identical to or different from each another. For example, p and q are integers satisfying p+q=1 to 15, 3 to 11, or 4 to 10. In the formula (2), $R^{21}$, $R^{22}$, $R^{23}$, and $R^{24}$ may be identical to or different from each other, and each of $R^{21}$, $R^{22}$, $R^{23}$, and $R^{24}$ is a straight or branched chain alkyl group having 1 to 5 carbon atom(s).

The acetylenic glycol-based surfactant may be, for example, a commercially available product. The commercially available product is exemplified, for example, by "OLFIN (trade name) E1010", "OLFIN (trade name) E1006", and "OLFIN (trade name) E1004" produced by Nissin Chemical Industry Co., Ltd.

The blending amount (S) of the nonionic surfactant in the entire amount of the water-based ink is, for example, in a range of 0.01% by weight to 1% by weight, in a range of 0.1% by weight to 0.5% by weight, or in a range of 0.1% by weight to 0.2% by weight.

The acetylenic glycol-based surfactant is not likely to dissolve in a water-based ink in some cases. In the water-based ink of the present teaching, however, it is assumed that the dye represented by the formula (1) interacts with the acetylenic glycol-based surfactant, for example, it may adsorb the acetylenic glycol-based surfactant. Accordingly, solubility of the acetylenic glycol-based surfactant in the water-based ink improves, and thus the water-based ink of the present teaching may contain a sufficient amount of the acetylenic glycol-based surfactant.

In the water-based ink, the ratio (S/D) of the blending amount (S: % by weight) of the nonionic surfactant to the solid content blending amount (D: % by weight) of the dye represented by the formula (1) in the entire amount of the water-based ink is preferably 0.1 to 0.25. If S/D=0.1 to 0.25 is satisfied, it is possible to obtain the water-based ink that is much less likely to cause discharge-bending and the like. If the ratio(S/D) exceeds 0.25, the amount of the nonionic surfactant interacting with the dye is large and the amount of the water-soluble resin interacting with the dye is small. This could reduce the effect of preventing the discharge-bending. If the ratio (S/D) is less than 0.1, the water-based ink contains a small amount of the nonionic surfactant. This could reduce the effect of the nonionic surfactant, for example, in which the water-based ink spreads on the recording medium to improve chromaticness.

The water-based ink may or may not contain another surfactant (e.g., an anionic surfactant or cationic surfactant) in addition to the nonionic surfactant.

The water-based ink may further contain a water-soluble organic solvent. The water-soluble organic solvent is exemplified, for example, by a humectant that prevents the water-based ink from drying at an end of a nozzle in an ink-jet head and a penetrant that adjusts the drying velocity on a recording medium.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. It is allowable that only one kind of the humectant as described above is used singly, or two or more kinds of the humectants are used in combination. Among the above-described humectants, the humectant may preferably be a polyvalent alcohol such as alkylene glycol and glycerol.

The blending amount of the humectant in the entire amount of the water-based ink is, for example, in a range of 0% by weight to 95% by weight, in a range of 5% by weight to 80% by weight, or in a range of 5% by weight to 50% by weight.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One type of the penetrant may be used singly, or two or more of the penetrants may be used in combination.

The blending amount of the penetrant in the entire amount of the water-based ink is, for example, in a range of 0% by weight to 20% by weight, in a range of 0% by weight to 15% by weight, or in a range of 1% by weight to 6% by weight.

The water-based ink may further contain a conventionally known additive, as necessary. The additive is exemplified, for example, by pH-adjusting agents, viscosity-adjusting agents, surface tension-adjusting agents, and fungicides. The viscosity-adjusting agents are exemplified, for example, by polyvinyl alcohol and cellulose.

The water-based ink may be prepared, for example by mixing the pigment, the dye represented by the formula (1), water, the water-soluble resin, and optionally other additive component(s) as necessary uniformly or homogeneously through any conventionally known method, and then removing undissolved matters by a filter or the like.

As described above, the water-based ink for ink-jet recording of the present teaching, which contains the pigment, the dye represented by the formula (1), and the water-soluble resin, has improved chromaticness and is not likely to cause discharge-bending and the like.

Subsequently, an explanation will be made about an ink-jet recording apparatus of the present teaching.

The ink-jet recording apparatus of the present teaching is an ink-jet recording apparatus characterized by including: an ink accommodating section configured to accommodate an ink therein; and an ink jetting mechanism configured to jet the ink accommodated in the ink accommodating section, wherein the ink accommodated in the ink accommodating section is the water-based ink for ink-jet recording of the present teaching.

The FIGURE depicts an exemplary configuration of the ink-jet recording apparatus of the present teaching. As depicted in the FIGURE, an ink-jet recording apparatus 1 of the present teaching includes four ink cartridges 2, an ink jetting mechanism (ink-jet head) 3, a head unit 4, a carriage 5, a driving unit 6, a platen roller 7 and a purge device 8 as main constitutive components or parts.

Each of the four ink cartridges 2 contains the corresponding one of four water-based inks of yellow, magenta, cyan, and black. For example, the water-based magenta ink is the water-based ink for ink-jet recording of the present teaching. Although this example uses a set with the four ink cartridges 2, instead of this, the present teaching may use an integrated type ink cartridge of which interior is comparted to form a water-based yellow ink accommodating section, a water-based magenta ink accommodating section, a water-based cyan ink accommodating section, and a water-based black ink accommodating section. As a body of the ink cartridge, for example, any conventionally known main body (body) of an ink cartridge may be used.

The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In the FIGURE, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use four ink bottles having a bottle shape, instead of using the four ink cartridges 2. In such a case, each of the ink bottles is preferably provided with an inlet port via which the ink is poured from the outside to the inside of the ink bottle.

Ink-jet recording using the ink-jet recording apparatus 1 is performed, for example, in the following manner Namely, at first, the recording sheet P is supplied or fed from a paper feeding cassette or sheet feeding cassette (not depicted in the drawing) arranged at a side of or at a position below the ink-jet recording apparatus 1. The recording sheet P is introduced or guided between the ink-jet head 3 and the platen roller 7. Then, a predefined recording is performed on the fed or introduced recording sheet P with the water-based ink(s) discharged or jetted from the ink-jet head 3. The recording sheet P after recording is discharged from the ink-jet recording apparatus 1. According to the present teaching, it is possible to obtain a recorded matter excellent in chromaticness and in which discharge-bending and the like is reduced. In the FIGURE, illustration of the feed mechanism and discharge mechanism for the recording paper P is omitted.

In the apparatus depicted in the FIGURE, an ink-jet head of serial type (serial type ink-jet head) is adopted. However, the present teaching is not limited to this. The ink-jet recording apparatus may be an apparatus adopting an ink-jet head of line type (line type ink-jet head).

The ink-jet recording method of the present teaching is an ink-jet recording method characterized by including: performing recording on a recording medium by discharging, to the recording medium, a water-based ink by an ink-jet system; and using the water-based ink for ink-jet recording of the present teaching, as the water-based ink. The recording includes printing a letter (text), printing an image, printing, and the like.

EXAMPLES

Next, examples of the present teaching will be explained together with comparative examples. Note that the present teaching is not limited by and is not restricted to the examples and the comparative examples which will be described below.

[Preparation of Pigment Dispersion Liquid]

Purified water was added to 20% by weight of each pigment indicated in TABLE 1 and 5.0% by weight of a resin dispersant (acrylic acid-acrylic acid ester copolymer), so that the sum of them was 100% by weight, followed by being stirred (agitated) and mixed with each other. This mixture was put in a wet sand mill using zirconia beads with a diameter of 0.3 mm as a medium to perform dispersion treatment for six hours. After that, the zirconia beads were removed by a separator, and the mixture thus obtained was filtrated through a cellulose acetate filter (pore size 3.00 μm). Accordingly, each of the pigment dispersion liquids 1 to 3 indicated in TABLE was obtained.

Examples 1 to 27 and Comparative Examples 1 to 8

Components, except for each pigment dispersion liquid or a self-dispersible magenta pigment, which were included in Water-based ink compositions (TABLE 1) as indicated below were mixed uniformly or homogeneously; and thus an ink solvent was obtained. Subsequently, the ink solvent was added to the pigment dispersion liquid or the self-dispersible magenta pigment dispersed in water, followed by being mixed uniformly. After that, the obtained mixture was filtrated through a cellulose acetate membrane filter (pore size 3.00 μm) produced by Toyo Roshi Kaisha, Ltd., and thus each of the water-based inks for ink-jet recording of Examples 1 to 27 and Comparative examples 1 to 8 as indicated in TABLE 1 was obtained. The dye (1-A) to the dye (1-E) indicated in TABLE 1 are the compound represented by the formula (1-A) to the compound represented by the formula (1-E), respectively.

With respect to the water-based inks of Examples 1 to 27 and Comparative example 1 to 8, (a) evaluation for chromogenic property (chromaticness) and (b) evaluation for shift of ink droplets were conducted by the following methods. The term "shift of ink droplets" indicates such a state in which each ink droplet or dot of the water-based ink does not land at an expected landing position on the recording medium to cause deflection or deviation of ink droplets (ink landing error), namely, it indicates discharge-bending.

(a) Evaluation for Chromogenic Property (Chromaticness)

An ink-jet printer "DCP-J4225N" manufactured by BROTHER KOGYO KABUSHIKI KAISHA was used to record a solid image (single color patch) on a plain paper (plain paper "4200" produced by XEROX CORPORATION), with a resolution of 600 dpi×300 dpi, by using each of the water-based inks of Examples 1-27 and Comparative Examples 1-8. Thus, each evaluation sample was produced. The chromaticness (C*) of the solid image of each evaluation sample was measured by using a spectrophotometric colorimetry meter "SpectroEye" (field: 2°; reference white: Abs; light source: D50; density reference: ANSI T) manufactured by GRETAG MACBETH, and the evaluation was conducted for the solid image of each evaluation sample based on the following evaluation criterion.

<Evaluation Criterion for Chromogenic Property (Chromaticness) Evaluation>

A: C* was not less than 55.
B: C* was less than 55.

(b) Evaluation for Shift of Ink Droplets (Discharge-Bending)

The ink-jet printer "DCP-J4225N" was used to record a one-dot line every time 10 solid images were recorded on a plain paper ("4200" produced by XEROX CORPORATION), with a resolution of 600 dpi×300 dpi, in an environment at temperature: 35° C. and relative humidity: 80%, by using each of the water-based inks for ink-jet recording of Examples 1-27 and Comparative Examples 1 to 8. Then, whether each one-dot line had a blank part or void (dot-lack or print-lack) and shift of ink droplets (discharge-bending) was caused were checked visually, and the evaluation was conducted for each one-dot line based on the following evaluation criterion.

<Evaluation Criterion for Evaluation for Shift of Ink Droplets>

A: No void and no discharge-bending (shift of ink droplets) were present when recording was performed on not less than 100 sheets of paper.
B: At least one void or at least one discharge-bending (at least one shift of ink droplets) were present when recording was performed on not less than 50 sheets of paper and less than 100 sheets of paper.
C: At least one void or at least one discharge-bending (at least one shift of ink droplets) were present when recording was performed on less than 50 sheets of paper.

TABLE 1 indicates the configurations and evaluation results of the water-based inks of Examples 1 to 27 and Comparative Examples 1 to 8.

TABLE 1 (following)—LEGEND

*1: Water dispersion (containing resin dispersant (acrylic acid-acrylic acid ester copolymer)) of C. I. Pigment Red 122

*2: Water dispersion (containing resin dispersant (acrylic acid-acrylic acid ester copolymer)) of C. I. Pigment Violet 19

*3: Water dispersion (containing resin dispersant (acrylic acid-acrylic acid ester copolymer)) of a solid solution of C. I. Pigment Red 122 and C. I. Pigment Violet 19

*4: Self-dispersible magenta pigment produced by Cabot Corporation

*5: Binder resin (styrene acrylic resin) produced by BASF Corporation (the former Johnson Polymer L.L.C.)

*6: Nonionic surfactant represented by the formula (2) produced by NISSHIN KAGAKU KOGYO KK; the active ingredient amount: 100% by weight

*7: Nonionic surfactant represented by the formula (2) produced by NIS SHIN KAGAKU KOGYO KK; the active ingredient amount: 100% by weight The blending amounts of pigments, resin dispersant, dyes, and binder resin indicate the solid content blending amounts, respectively.

TABLE 1

|  |  |  | Examples | | | | | | | |
| --- | --- | --- | --- | --- | --- | --- | --- | --- | --- | --- |
|  |  |  | 1 | 2 | 3 | 4 | 5 | 6 | 7 | 8 |
| Water-based ink compositions (% by weight) | Pigment dispersion liquid 1 (*1) | Pigment Resin dispersant | 5 1.5 | 5 1.5 | 5 1.5 | 5 1.5 | 5 1.5 | 5 1.5 | 5 1.5 | 5 1.5 |
|  | Pigment dispersion liquid 2 (*2) | Pigment Resin dispersant | — | — | — | — | — | — | — | — |
|  | Pigment dispersion liquid 3 (*3) | Pigment Resin dispersant | — | — | — | — | — | — | — | — |
|  | CAB-O-JET (trade name) 465M (*4) | Pigment | — | — | — | — | — | — | — | — |
|  | Dye (1-A) |  | 1 | — | — | — | — | — | — | — |
|  | Dye (1-B) |  | — | 1 | — | — | — | — | — | — |
|  | Dye (1-C) |  | — | — | 1 | — | — | — | — | — |
|  | Dye (1-D) |  | — | — | — | 1 | — | 2 | 0.5 | 0.9 |
|  | Dye (1-E) |  | — | — | — | — | 1 | — | — | — |
|  | C.I. Acid Red 289 |  | — | — | — | — | — | — | — | — |

TABLE 1-continued

|  |  |  | | | | | | | | |
|---|---|---|---|---|---|---|---|---|---|---|
|  | JOHNCRYL (trade name) 61J (*5) | | 0.5 | 0.5 | 0.5 | 0.5 | 0.5 | 0.5 | 0.5 | 0.5 |
|  | OLFIN (trade name) E1004 (*6) | | 0.2 | 0.2 | 0.2 | 0.2 | 0.2 | 0.2 | 0.2 | 0.2 |
|  | OLFIN (trade name) E1010 (*7) | | — | — | — | — | — | — | — | — |
|  | Triethylene glycol-n-butyl ether | | 4 | 4 | 4 | 4 | 4 | 4 | 4 | 4 |
|  | Glycerol | | 12 | 12 | 12 | 12 | 12 | 12 | 12 | 12 |
|  | Water | | balance | balance | balance | balance | balance | balance | balance | balance |
|  | R/D | | 2.0 | 2.0 | 2.0 | 2.0 | 2.0 | 1.0 | 4.0 | 2.2 |
|  | S/D | | 0.2 | 0.2 | 0.2 | 0.2 | 0.2 | 0.1 | 0.4 | 0.22 |
|  | Chromogenic property (chromaticness) | | A | A | A | A | A | A | B | B |
|  | Shift of ink droplets (discharge-bending) | | A | A | A | A | A | A | B | B |

| | | | Examples | | | | | | | |
|---|---|---|---|---|---|---|---|---|---|---|
| | | | 9 | 10 | 11 | 12 | 13 | 14 | 15 | 16 |
| Water-based ink compositions (% by weight) | Pigment dispersion liquid 1 (*1) | Pigment | 5 | 5 | 3 | 4 | 6 | 7 | 8 | 5 |
| | | Resin dispersant | 1.5 | 1.5 | 0.9 | 1.2 | 2 | 2.3 | 2.7 | 1.5 |
| | Pigment dispersion liquid 2 (*2) | Pigment | — | — | — | — | — | — | — | — |
| | | Resin dispersant | | | | | | | | |
| | Pigment dispersion liquid 3 (*3) | Pigment | — | — | — | — | — | — | — | — |
| | | Resin dispersant | | | | | | | | |
| | CAB-O-JET (trade name) 465M (*4) | Pigment | — | — | — | — | — | — | — | — |
| | Dye (1-A) | | — | — | — | — | — | — | — | — |
| | Dye (1-B) | | — | — | — | — | — | — | — | — |
| | Dye (1-C) | | — | — | — | — | — | — | — | — |
| | Dye (1-D) | | 3 | 4 | 1 | 1 | 1 | 1 | 1 | 1 |
| | Dye (1-E) | | — | — | — | — | — | — | — | — |
| | C.I. Acid Red 289 | | — | — | — | — | — | — | — | — |
| | JOHNCRYL (trade name) 61J (*5) | | 0.5 | 0.5 | 0.5 | 0.5 | 0.5 | 0.5 | 0.5 | — |
| | OLFIN (trade name) E1004 (*6) | | 0.2 | 0.2 | 0.2 | 0.2 | 0.2 | 0.2 | 0.2 | 0.2 |
| | OLFIN (trade name) E1010 (*7) | | — | — | — | — | — | — | — | — |
| | Triethylene glycol-n-butyl ether | | 4 | 4 | 4 | 4 | 4 | 4 | 4 | 4 |
| | Glycerol | | 12 | 12 | 12 | 12 | 12 | 12 | 12 | 12 |
| | Water | | balance | balance | balance | balance | balance | balance | balance | balance |
| | R/D | | 0.5 | 0.7 | 1.4 | 1.7 | 2.5 | 2.8 | 3.2 | 1.5 |
| | S/D | | 0.07 | 0.05 | 0.2 | 0.2 | 0.2 | 0.2 | 0.2 | 0.2 |
| | Chromogenic property (chromaticness) | | A | A | B | B | A | A | A | A |
| | Shift of ink droplets (discharge-bending) | | A | A | A | A | B | B | B | A |

| | | | Examples | | | | | | | |
|---|---|---|---|---|---|---|---|---|---|---|
| | | | 17 | 18 | 19 | 20 | 21 | 22 | 23 | 24 |
| Water-based ink compositions (% by weight) | Pigment dispersion liquid 1 (*1) | Pigment | 5 | 5 | 5 | 5 | 5 | 5 | 5 | 5 |
| | | Resin dispersant | 1.5 | 1.5 | 1.5 | 1.5 | 1.5 | 1.5 | 1.5 | 1.5 |
| | Pigment dispersion liquid 2 (*2) | Pigment | — | — | — | — | — | — | — | — |
| | | Resin dispersant | | | | | | | | |
| | Pigment dispersion liquid 3 (*3) | Pigment | — | — | — | — | — | — | — | — |
| | | Resin dispersant | | | | | | | | |
| | CAB-O-JET (trade name) 465M (*4) | Pigment | — | — | — | — | — | — | — | — |
| | Dye (1-A) | | — | — | — | — | — | — | — | — |
| | Dye (1-B) | | — | — | — | — | — | — | — | — |
| | Dye (1-C) | | — | — | — | — | — | — | — | — |
| | Dye (1-D) | | 1 | 1 | 1 | 1 | 1 | 1 | 1 | 1 |
| | Dye (1-E) | | — | — | — | — | — | — | — | — |
| | C.I. Acid Red 289 | | — | — | — | — | — | — | — | — |
| | JOHNCRYL (trade name) 61J (*5) | | 1 | 1.5 | 0.5 | 0.5 | 0.5 | 0.5 | 0.5 | 0.5 |
| | OLFIN (trade name) E1004 (*6) | | 0.2 | 0.2 | — | 0.1 | 0.15 | 0.25 | 0.3 | 1 |
| | OLFIN (trade name) E1010 (*7) | | — | — | 0.2 | — | — | — | — | — |
| | Triethylene glycol-n-butyl ether | | 4 | 4 | 4 | 4 | 4 | 4 | 4 | 4 |
| | Glycerol | | 12 | 12 | 12 | 12 | 12 | 12 | 12 | 12 |
| | Water | | balance | balance | balance | balance | balance | balance | balance | balance |
| | R/D | | 2.5 | 3.0 | 2.0 | 2.0 | 2.0 | 2.0 | 2.0 | 2.0 |

TABLE 1-continued

|  |  |  |  |  |  |  |  |  |  |
|---|---|---|---|---|---|---|---|---|---|
|  | S/D |  | 0.2 | 0.2 | 0.2 | 0.1 | 0.15 | 0.25 | 0.3 | 1.0 |
|  | Chromogenic property (chromaticness) |  | A | A | A | A | A | A | A | A |
|  | Shift of ink droplets (discharge-bending) |  | B | B | A | A | A | A | B | B |

|  |  |  | Examples | | | Comparative Examples | | | | |
|---|---|---|---|---|---|---|---|---|---|---|
|  |  |  | 25 | 26 | 27 | 1 | 2 | 3 | 4 | 5 |
| Water-based ink compositions (% by weight) | Pigment dispersion liquid 1 (*1) | Pigment | — | — | — | 5 | 5 | — | — | — |
|  |  | Resin dispersant |  |  |  | 1.5 | 1.5 |  |  |  |
|  | Pigment dispersion liquid 2 (*2) | Pigment | 5 | — | — | — | — | 5 | 5 | — |
|  |  | Resin dispersant | 1.5 |  |  |  |  | 1.5 | 1.5 |  |
|  | Pigment dispersion liquid 3 (*3) | Pigment | — | 5 | — | — | — | — | — | 5 |
|  |  | Resin dispersant |  | 1.5 |  |  |  |  |  | 1.5 |
|  | CAB-O-JET (trade name) 465M (*4) | Pigment | — | — | 5 | — | — | — | — | — |
|  | Dye (1-A) |  | — | — | — | — | — | — | — | — |
|  | Dye (1-B) |  | — | — | — | — | — | — | — | — |
|  | Dye (1-C) |  | — | — | — | — | — | — | — | — |
|  | Dye (1-D) |  | 1 | 1 | 1 | — | — | — | — | — |
|  | Dye (1-E) |  | — | — | — | — | — | — | — | — |
|  | C.I. Acid Red 289 |  | — | — | — | — | 1 | — | 1 | — |
|  | JOHNCRYL (trade name) 61J (*5) |  | 0.5 | 0.5 | 0.5 | 0.5 | 0.5 | 0.5 | 0.5 | 0.5 |
|  | OLFIN (trade name) E1004 (*6) |  | 0.2 | 0.2 | 0.2 | 0.2 | 0.2 | 0.2 | 0.2 | 0.2 |
|  | OLFIN (trade name) E1010 (*7) |  | — | — | — | — | — | — | — | — |
|  | Triethylene glycol-n-butyl ether |  | 4 | 4 | 4 | 4 | 4 | 4 | 4 | 4 |
|  | Glycerol |  | 12 | 12 | 12 | 12 | 12 | 12 | 12 | 12 |
|  | Water |  | balance | balance | balance | balance | balance | balance | balance | balance |
|  | R/D |  | 2.0 | 2.0 | 0.5 | — | 2.0 | — | 2.0 | — |
|  | S/D |  | 0.2 | 0.2 | 0.2 | — | 0.2 | — | 0.2 | — |
|  | Chromogenic property (chromaticness) |  | A | A | A | B | A | B | A | B |
|  | Shift of ink droplets (discharge-bending) |  | A | A | A | C | C | C | C | C |

|  |  |  | Comparative Examples | | |
|---|---|---|---|---|---|
|  |  |  | 6 | 7 | 8 |
| Water-based ink compositions (% by weight) | Pigment dispersion liquid 1 (*1) | Pigment | — | — | — |
|  |  | Resin dispersant |  |  |  |
|  | Pigment dispersion liquid 2 (*2) | Pigment | — | — | — |
|  |  | Resin dispersant |  |  |  |
|  | Pigment dispersion liquid 3 (*3) | Pigment | 5 | — | — |
|  |  | Resin dispersant | 1.5 |  |  |
|  | CAB-O-JET (trade name) 465M (*4) | Pigment | — | 5 | 5 |
|  | Dye (1-A) |  | — | — | — |
|  | Dye (1-B) |  | — | — | — |
|  | Dye (1-C) |  | — | — | — |
|  | Dye (1-D) |  | — | — | — |
|  | Dye (1-E) |  | — | — | — |
|  | C.I. Acid Red 289 |  | 1 | — | 1 |
|  | JOHNCRYL (trade name) 61J (*5) |  | 0.5 | 0.5 | 0.5 |
|  | OLFIN (trade name) E1004 (*6) |  | 0.2 | 0.2 | 0.2 |
|  | OLFIN (trade name) E1010 (*7) |  | — | — | — |
|  | Triethylene glycol-n-butyl ether |  | 4 | 4 | 4 |
|  | Glycerol |  | 12 | 12 | 12 |
|  | Water |  | balance | balance | balance |
|  | R/D |  | 2.0 | — | 0.5 |
|  | S/D |  | 0.2 | — | 0.2 |
|  | Chromogenic property (chromaticness) |  | A | B | A |
|  | Shift of ink droplets (discharge-bending) |  | C | C | C |

As indicated in TABLE 1, Examples 1 to 27 had good evaluation results of the chromogenic property (chromaticness) and shift of ink droplets (discharge-bending).

In Examples 4 and 6 to 10, the solid content blending amounts of the dye were varied as shown in TABLE 1. Examples 4, 6, 9 and 10, in which R/D was 0.5 to 2.0 and the solid content blending amount of the dye was not less than 1% by weight, had evaluation results of the chromogenic property and shift of ink droplets (discharge-bending) better than those of Examples 7 and 8 in which R/D exceeded 2 and the solid content blending amount of the dye was less than 1% by weight.

In Examples 4 and 11 to 15, the solid content blending amounts of the pigment and resin dispersant were varied as shown in TABLE 1. Example 4, in which R/D was 2.0, had an evaluation result of shift of ink droplets (discharge-bending) better than those of Examples 13 to 15 in which R/D exceeded 2. Examples 11 and 12, in which R/D was 0.5 to 2.0, had evaluation results of shift of ink droplets (discharge-bending) better than those of Examples 13 to 15 in which R/D exceeded 2. The reason why the chromaticness of each of Examples 11 and 12 was slightly inferior to those of Examples 13 to 15 may be because the blending amount (pigment solid content amount) of the colorant in each of Examples 11 and 12 was smaller than those in Examples 13 to 15. Thus, the pigment solid content amount in the water-based ink is preferably not less than 5% by weight.

In Examples 4 and 16 to 18, the solid content blending amounts of the binder resin were varied as shown in TABLE 1. Examples 4 and 16, in which R/D were 2.0 and 1.5 respectively (i.e., R/D was 0.5 to 2.0), had evaluation results of shift of ink droplets (discharge-bending) better than those of Examples 17 and 18 in which R/D exceeded 2.

In Examples 4 and 20 to 24, the blending amounts of the nonionic surfactant were varied as shown in TABLE 1. Examples 4 and 20 to 22, in which S/D was 0.1 to 0.25, had evaluation results of shift of ink droplets (discharge-bending) better than those of Examples 23 and 24 in which S/D exceeded 0.25.

Comparative examples 1, 3, 5, and 7 containing no dye and Comparative examples 2, 4, 6, and 8 of which dye was C.I. Acid Red 289 had bad evaluation results of shift of ink droplets (discharge-bending). C.I. Acid Red 289 is a compound represented by the following formula (3). Unlike the dye represented by the formula (1), C.I. Acid Red 289 can not have a bulky configuration in the water-based ink. Thus, it is assumed that C.I. Acid Red 289 interacted poorly with the water-soluble resin and thus it was not able to prevent shift of ink droplets (discharge-bending).

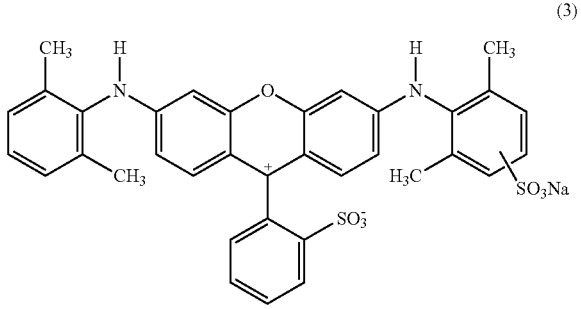

(3)

As described above, the water-based ink of the present teaching has improved chromaticness (color, hue, tint) and is not likely to cause shift of ink droplets, such as discharge-bending. The usage of the water-based ink of the present teaching is not particularly limited, and is widely applicable to a variety of kinds of ink-jet recording.

What is claimed is:

1. A water-based ink for ink-jet recording, comprising:
   a colorant containing a pigment and a dye represented by the following formula (1);
   water; and
   a water-soluble resin,

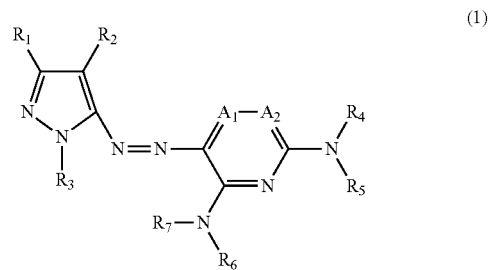

(1)

in the formula (1), $R_1$ is a hydrogen atom, a substituted or non-substituted alkyl group, or a substituted or non-substituted aryl group, $R_2$ is a hydrogen atom, a halogen atom, or a cyano group, $R_3$ is a hydrogen atom, a substituted or non-substituted alkyl group, a substituted or non-substituted aryl group, or a substituted or non-substituted heterocyclic group, each of $R_4$, $R_5$, $R_6$ and $R_7$ is a hydrogen atom, a substituted or non-substituted alkyl group, a substituted or non-substituted aryl group, a substituted or non-substituted heterocyclic group, a substituted or non-substituted sulfonyl group, or a substituted or non-substituted acyl group, $R_4$, $R_5$, $R_6$ and $R_7$ are identical to or different from each other, $R_4$ and $R_5$ are not simultaneously the hydrogen atom, $R_6$ and $R_7$ are not simultaneously the hydrogen atom, and both of $A_1$ and $A_2$ are substituted or non-substituted carbon atoms, or one of $A_1$ and $A_2$ is a substituted or non-substituted carbon atom and the other of $A_1$ and $A_2$ is a nitrogen atom;

wherein:
   a ratio (R/D) of a solid content blending amount (R) of the water-soluble resin to a solid content blending amount (D) of the dye represented by the formula (1) is 0.5 to 2, and
   a ratio (D/P) of a solid content blending amount (D) of the dye to a solid content blending amount (P) of the pigment in the water-based ink is 0.1 to 0.8.

2. The water-based ink for ink-jet recording according to claim 1, wherein a solid content blending amount (D) of the dye represented by the formula (1) in an entire amount of the water-based ink is not less than 1% by weight.

3. The water-based ink for ink-jet recording according to claim 1, further comprising a nonionic surfactant,
   wherein a ratio (S/D) of a blending amount (S) of the nonionic surfactant to a solid content blending amount (D) of the dye represented by the formula (1) in the water-based ink is 0.1 to 0.25.

4. The water-based ink for ink-jet recording according to claim 3, wherein the nonionic surfactant is an acetylenic glycol-based surfactant.

5. The water-based ink for ink-jet recording according to claim 1, wherein the pigment is a resin-dispersible pigment.

6. The water-based ink for ink-jet recording according to claim 5, wherein the water-soluble resin contains a resin dispersant and a binder resin.

7. The water-based ink for ink-jet recording according to claim 5, wherein the water-soluble resin contains a resin dispersant, and a weight ratio of the resin dispersant to the pigment in the water-based ink is 0.2 to 0.5.

8. The water-based ink for ink-jet recording according to claim 1, wherein the pigment is a magenta pigment.

9. The water-based ink for ink-jet recording according to claim 1, wherein the pigment is quinacridone and/or derivative thereof.

10. The water-based ink for ink-jet recording according to claim 1, wherein the pigment is C.I. Pigment Red 122.

11. The water-based ink for ink-jet recording according to claim 1, wherein the water-soluble resin is acrylic acid-acrylic acid ester copolymer and/or styrene acrylic resin.

12. The water-based ink for ink-jet recording according to claim 1, wherein the dye represented by the formula (1) is one of compounds represented by the following formulae (1-A) to (1-F)

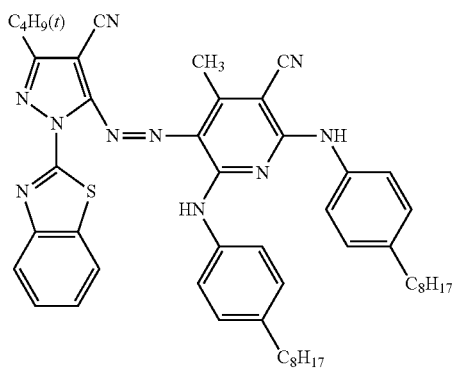
(1-A)

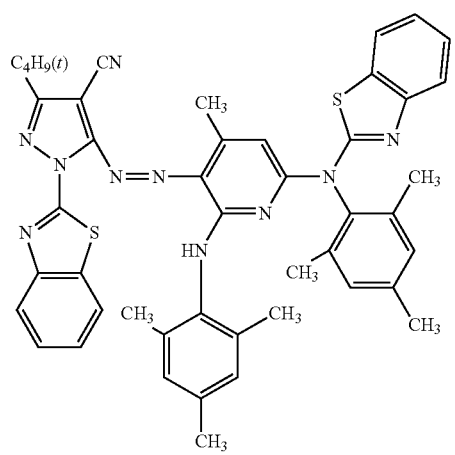
(1-B)

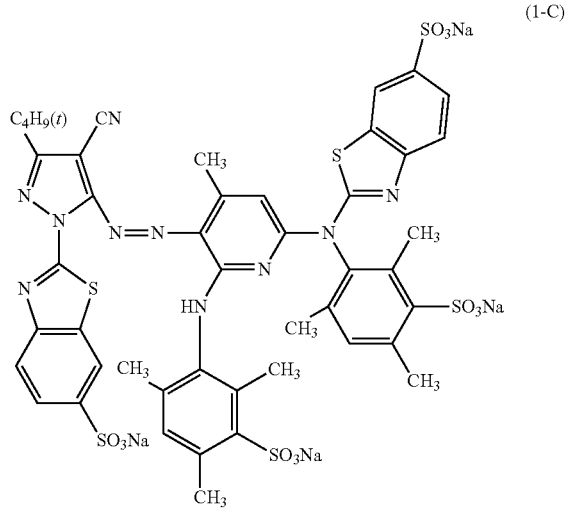
(1-C)

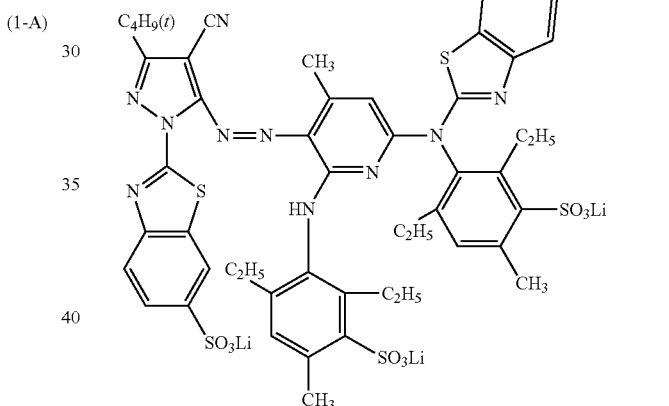
(1-D)

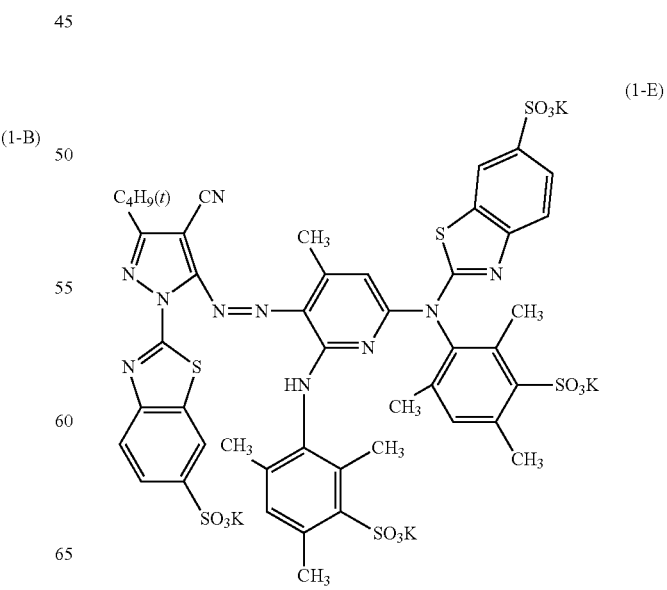
(1-E)

-continued
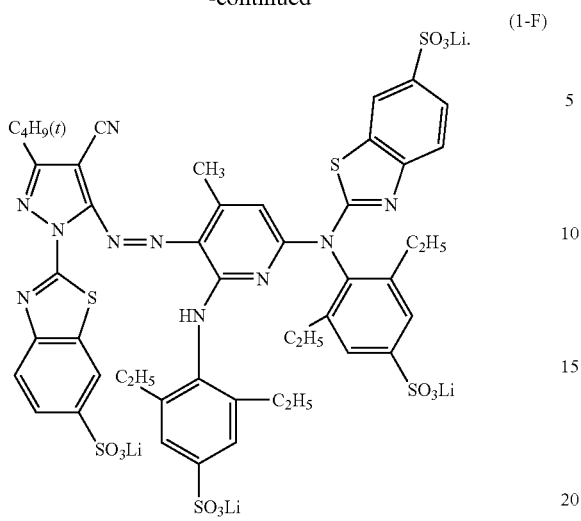
(1-F)